US010003824B2

(12) United States Patent
Sullivan

(10) Patent No.: US 10,003,824 B2
(45) Date of Patent: *Jun. 19, 2018

(54) REDUCING LATENCY IN VIDEO ENCODING AND DECODING

(71) Applicant: Microsoft Technology Licensing, LLC, Redmond, WA (US)

(72) Inventor: Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/647,962

(22) Filed: Jul. 12, 2017

(65) Prior Publication Data
US 2017/0311000 A1 Oct. 26, 2017

Related U.S. Application Data

(63) Continuation of application No. 15/201,160, filed on Jul. 1, 2016, now Pat. No. 9,729,898, which is a (Continued)

(51) Int. Cl.
*H04N 19/88* (2014.01)
*H04N 19/70* (2014.01)
(Continued)

(52) U.S. Cl.
CPC .......... *H04N 19/70* (2014.11); *H04N 19/103* (2014.11); *H04N 19/15* (2014.11); *H04N 19/172* (2014.11);
(Continued)

(58) Field of Classification Search
None
See application file for complete search history.

(56) References Cited

U.S. PATENT DOCUMENTS 4,309,754 A 1/1982 Dinwiddie, Jr.
4,642,756 A 2/1987 Sherrod
(Continued)

FOREIGN PATENT DOCUMENTS

CN 1497941 5/2004
CN 1960472 5/2007
(Continued)

OTHER PUBLICATIONS

3rd Generation Partnership Project, "Multimedia Telephony over IP Multimedia Subsystem (IMS); Optimization Opportunities (Release 7)," 3GPP Technical Report TR 26.914 V7.0.0, 18 pp. (Mar. 2006).
(Continued)

*Primary Examiner* — William C Vaughn, Jr.
*Assistant Examiner* — Stuart Bennett
(74) *Attorney, Agent, or Firm* — Klarquist Sparkman, LLP

(57) ABSTRACT

Techniques and tools for reducing latency in video encoding and decoding by constraining latency due to reordering of video frames, and by indicating the constraint on frame reordering latency with one or more syntax elements that accompany encoded data for the video frames. For example, a real-time communication tool with a video encoder sets a syntax element that indicates a constraint on frame reordering latency, which is consistent with inter-frame dependencies between multiple frames of a video sequence, then outputs the syntax element. A corresponding real-time communication tool with a video decoder receives the syntax element that indicates the constraint on frame reordering latency, determines the constraint on frame reordering latency based on the syntax element, and uses the constraint on frame reordering latency to determine when a reconstructed frame is ready for output (in terms of output order).

20 Claims, 8 Drawing Sheets

Related U.S. Application Data continuation of application No. 14/458,997, filed on Aug. 13, 2014, now Pat. No. 9,426,495, which is a continuation of application No. 13/270,969, filed on Oct. 11, 2011, now Pat. No. 8,837,600.

(60) Provisional application No. 61/571,553, filed on Jun. 30, 2011.

(51) Int. Cl.

| | | |
|---|---|---|
| *H04N 19/172* | (2014.01) | |
| *H04N 19/46* | (2014.01) | |
| *H04N 19/103* | (2014.01) | |
| *H04N 19/31* | (2014.01) | |
| *H04N 19/44* | (2014.01) | |
| *H04N 19/15* | (2014.01) | |
| *H04N 19/184* | (2014.01) | |

(52) U.S. Cl.
CPC ............ *H04N 19/31* (2014.11); *H04N 19/44* (2014.11); *H04N 19/46* (2014.11); *H04N 19/88* (2014.11); *H04N 19/184* (2014.11)

(56) References Cited

U.S. PATENT DOCUMENTS

| | | | |
|---|---|---|---|
| 5,465,335 A | 11/1995 | Anderson | |
| 5,861,920 A | 1/1999 | Mead et al. | |
| 5,909,559 A | 6/1999 | So | |
| 6,002,801 A | 12/1999 | Strongin et al. | |
| 6,006,303 A | 12/1999 | Barnaby et al. | |
| 6,105,048 A | 8/2000 | He | |
| 6,219,502 B1 | 4/2001 | Osari et al. | |
| 6,249,288 B1 | 6/2001 | Campbell | |
| 6,278,691 B1 | 8/2001 | Ohyama et al. | |
| 6,298,166 B1 | 10/2001 | Ratnakar et al. | |
| 6,427,058 B1 | 7/2002 | Akiba et al. | |
| 6,438,169 B1 | 8/2002 | Takashima et al. | |
| 6,782,368 B2 | 8/2004 | Fujii et al. | |
| 6,823,016 B1 | 11/2004 | Nguyen et al. | |
| 6,963,347 B1 | 11/2005 | Selvaggi et al. | |
| 7,043,088 B2 | 5/2006 | Chiu et al. | |
| 7,072,404 B2 | 7/2006 | Itokawa | |
| 7,085,322 B2 | 8/2006 | Ngai et al. | |
| 7,099,389 B1 | 8/2006 | Yu et al. | |
| 7,116,714 B2 | 10/2006 | Hannuksela | |
| 7,130,526 B2 | 10/2006 | Abelard et al. | |
| 7,289,047 B2 | 10/2007 | Nagori | |
| 7,366,236 B1 | 4/2008 | Winger | |
| 7,370,325 B1 | 5/2008 | Hull et al. | |
| 7,424,730 B2 | 9/2008 | Chou | |
| 7,573,407 B2 | 8/2009 | Reznik | |
| 7,653,128 B2 | 1/2010 | Shibata et al. | |
| 7,735,087 B2 | 6/2010 | Hayashi | |
| 7,787,539 B2 | 8/2010 | Chen | |
| 7,817,723 B2 | 10/2010 | Wiegand et al. | |
| 7,889,788 B2 | 2/2011 | Toma et al. | |
| 8,107,744 B2 | 1/2012 | Tian et al. | |
| 8,291,448 B2 | 10/2012 | Pekonen et al. | |
| 8,396,082 B2 | 3/2013 | Hannuksela et al. | |
| 8,670,486 B2 | 3/2014 | Hannuksela | |
| 9,179,157 B2 | 11/2015 | Zhu et al. | |
| 2002/0036707 A1 | 3/2002 | Gu | |
| 2003/0185298 A1 | 10/2003 | Alvarez et al. | |
| 2003/0235251 A1 | 12/2003 | Hsiun et al. | |
| 2004/0117427 A1 | 6/2004 | Allen et al. | |
| 2004/0146109 A1 | 7/2004 | Kondo et al. | |
| 2004/0190617 A1 | 9/2004 | Shen et al. | |
| 2004/0208245 A1 | 10/2004 | MacInnis et al. | |
| 2005/0053157 A1 | 3/2005 | Lillevold | |
| 2005/0175091 A1 | 8/2005 | Puri et al. | |
| 2005/0180511 A1 | 8/2005 | Arafune et al. | |
| 2005/0289505 A1 | 12/2005 | Williams | |
| 2006/0002479 A1 | 1/2006 | Fernandes | |
| 2006/0056517 A1 | 3/2006 | MacInnis et al. | |
| 2006/0114995 A1 | 6/2006 | Robey et al. | |
| 2006/0126726 A1 | 6/2006 | Lin et al. | |
| 2006/0126744 A1 | 6/2006 | Peng et al. | |
| 2006/0133474 A1 | 6/2006 | Veltman et al. | |
| 2006/0133479 A1 | 6/2006 | Chen et al. | |
| 2006/0133770 A1 | 6/2006 | Shibata et al. | |
| 2006/0193383 A1 | 8/2006 | Alvarez et al. | |
| 2006/0204119 A1 | 9/2006 | Feng et al. | |
| 2006/0215754 A1 | 9/2006 | Buxton et al. | |
| 2006/0227872 A1 | 10/2006 | Mori et al. | |
| 2006/0233525 A1 | 10/2006 | Shibata et al. | |
| 2006/0239343 A1 | 10/2006 | Mohsenian | |
| 2006/0248516 A1 | 11/2006 | Gordon | |
| 2007/0030911 A1 | 2/2007 | Yoon | |
| 2007/0183507 A1 | 8/2007 | Maheshwari et al. | |
| 2007/0223595 A1 | 9/2007 | Hannuksela et al. | |
| 2007/0233989 A1 | 10/2007 | Garcia-Arellano et al. | |
| 2007/0286276 A1 | 12/2007 | Gartner et al. | |
| 2007/0291857 A1 | 12/2007 | Hussain | |
| 2007/0297501 A1 | 12/2007 | Hussain | |
| 2008/0013620 A1 | 1/2008 | Hannuksela et al. | |
| 2008/0048894 A1 | 2/2008 | Ridge et al. | |
| 2008/0107184 A1 | 5/2008 | Katsavounidis et al. | |
| 2008/0123736 A1 | 5/2008 | Sekiguchi et al. | |
| 2008/0137736 A1 | 6/2008 | Richardson et al. | |
| 2008/0159408 A1 | 7/2008 | Degtyarenko | |
| 2008/0225949 A1 | 9/2008 | Adachi et al. | |
| 2008/0304520 A1 | 12/2008 | Hannuksela et al. | |
| 2009/0002379 A1 | 1/2009 | Baeza et al. | |
| 2009/0003446 A1 | 1/2009 | Wu et al. | |
| 2009/0003447 A1 | 1/2009 | Christoffersen et al. | |
| 2009/0003451 A1 | 1/2009 | Lin et al. | |
| 2009/0010337 A1 | 1/2009 | Wang | |
| 2009/0109988 A1 | 4/2009 | Musunuri et al. | |
| 2009/0147859 A1 | 6/2009 | McGowan et al. | |
| 2009/0175548 A1 | 7/2009 | Fukuhara et al. | |
| 2010/0008418 A1 | 1/2010 | Wu et al. | |
| 2010/0061643 A1 | 3/2010 | Fukuhara et al. | |
| 2010/0158135 A1 | 6/2010 | Yin et al. | |
| 2010/0189182 A1 | 7/2010 | Hannuksela | |
| 2010/0195721 A1 | 8/2010 | Wu et al. | |
| 2010/0208796 A1 | 8/2010 | Luo et al. | |
| 2010/0266012 A1 | 10/2010 | Chen | |
| 2011/0002376 A1 | 1/2011 | Nadeem et al. | |
| 2011/0002397 A1* | 1/2011 | Wang | H04N 19/70 375/240.26 |
| 2011/0080940 A1 | 4/2011 | Bocharov et al. | |
| 2012/0140820 A1 | 6/2012 | Kondo et al. | |

FOREIGN PATENT DOCUMENTS

| | | |
|---|---|---|
| CN | 101051465 | 10/2007 |
| CN | 101569170 | 10/2009 |
| CN | 101938341 | 1/2011 |
| EP | 0 909 094 | 4/1999 |
| EP | 1 195 992 | 4/2002 |
| EP | 1 383 333 | 1/2004 |
| JP | 2004-88736 | 3/2004 |
| JP | 2006-506027 | 2/2006 |
| JP | 2010-541471 | 12/2010 |
| JP | 2013-535884 | 9/2013 |
| RU | 2009129945 | 2/2011 |
| TW | 200901773 | 1/2009 |
| TW | 201112772 | 4/2011 |
| WO | WO 2006/096612 | 9/2006 |
| WO | WO 2006/134110 | 12/2006 |
| WO | WO 2010/057027 | 5/2010 |
| WO | WO 2011/043885 | 4/2011 |
| WO | WO 2012/009454 | 1/2012 |

OTHER PUBLICATIONS

Akramullah et al., "Parallelization of MPEG-2 Video Encoder for Parallel and Distributed Computing Systems," *IEEE*, pp. 834-837 (Aug. 1995).

ATI Technologies, Inc., "Introduction to H.264," 6 pp. (month unknown, 2005).

(56) References Cited

OTHER PUBLICATIONS

Azevedo et al., "A Highly Scalable Parallel Implementation of H.264," Transactions on High-Performance Embedded Architectures and Compilers, 25 pp. (Sep. 2009).
Chen et al., "Implementation of H.264 Encoder and Decoder on Personal Computers," *Journal of Visual Comm. and Image Representation*, 19 pp. (Apr. 2006).
Chen, "Synchronization and Control of Multi-threads for MPEG-4 Video Decoder," *IEEE 1999 Int'l Conf. on Consumer Electronics*, pp. 298-299 (Jun. 1999).
Communication dated Mar. 10, 2016, from Israeli Patent Application No. 230189, 1 pp.
Communication Pursuant to Rules 70(2) and 70a(2) EPC dated Feb. 24, 2015, from European Patent Application No. 11868856.3, 1 pp.
Dawson, "Coding for Multiple Cores on Xbox 360 and Microsoft Windows," 8 pp. (Aug. 2006) [Downloaded from the Internet on Jan. 22, 2007].
De Neve et al., "Real-Time BSD-driven Adaptation Along the Temporal Axis of H.264/AVC Bitstreams," *Advances in Multimedia Information Processing*, pp. 131-140 (2006).
Decision of Patent Examination dated Dec. 31, 2015, from Taiwanese Patent Application No. 100136771, 4 pp.
Decision of Patent Examination dated Mar. 23, 2017, from Taiwanese Patent Application No. 105103519, 4 pp.
Duffy, "CLR Inside Out: Using Concurrency for Scalability," MSDN Magazine, 11 pp. (Sep. 2006) [Downloaded from the Internet on Jan. 22, 2007].
Examination Report dated Jul. 18 2014, for New Zealand Patent Application No. 619406, 2 pp.
Examination Report dated Sep. 15, 2015, for New Zealand Patent Application No. 619406, 2 pp.
Examination Report No. 2 dated Mar. 23, 2016, from Australian Patent Application No. 2011371809, 4 pp.
First Office Action and Search Report dated Dec. 1, 2014, for Chinese Patent Application No. 201180071993.6, 15 pp.
First Official Action dated May 4, 2015, from Chilean Patent Application No. 3736-2013 ,5 pp.
foldoc.org, "priority scheduling," 1 p. (No date) [Downloaded from the Internet on Jan. 26, 2007].
foldoc.org, "multitasking," 1 p. (Document dated Apr. 24, 1998) [Downloaded from the Internet on Jan. 26, 2007].
Gerber et al., "Optimizing Video Encoding using Threads and Parallelism: Part 1—Threading a Video Codec," 3 pp., downloaded from Embedded.com, (Dec. 2009).
Huang et al., "Joint Algorithm/Code-Level Optimization of H.264 Video Decoder for Mobile Multimedia Applications," ICASSP, pp. 2189-2192 (Mar. 2008).
Intel Corp., "Intel's Next Generation Integrated Graphics Architecture—Intel® Graphics Media Accelerator X3000 and 3000," 14 pp. (Jul. 2006).
International Search Report dated May 15, 2012, from International Patent Application No. PCT/US2011/055835, 3 pp.
ISO/IEC, "Information Technology—Coding of Audio-Visual Objects: Visual," ISO/IEC 14496-2, Committee Draft, 327 pp. (Mar. 1998).
ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).
ISO/IEC, "Text of ISO/IEC FCD 29199-2 (JPEG XR Image Coding—Specification)," ISO/IEC JTC 1/SC 29/WG 11 N4739, 173 pp. (Sep. 2008).
ISO/IEC, "Digital Compression and Coding of Continuous-tone Still Images," ISO DIS 10918-1, CCITT Recommendation T.81, 211 pp. (1992).
ISO/IEC, "Information Technology—Coding of Moving Pictures and Associated Audio for Digital Storage Media at up to About 1,5 Mbit/s—Part 2: Video," ISO/IEC 11172-2, 122 pp. (Aug. 1993).
ITU, "Advanced Video Coding for Generic Audiovisual Services," Recommendation ITU-T H.264 (2007).
ITU, "Advanced Video Coding for Generic Audiovisual Services," Recommendation ITU-T H.264, 676 pp. (Mar. 2010).
ITU-T Recommendation H.262, "Transmission of Non-Telephone Signals—Information Technology—Generic Coding of Moving Pictures and Associated Audio Information: Video," 218 pp. (Jul. 1995).
Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).
Joint Collaborative Team on Video Coding, "Description of Video Coding Technology Proposal by Texas Instruments Inc.," JCTVC-A101, 45 pp. (Apr. 2010).
Kim et al., "Multi-thread VLIW Processor Architecture for HDTV Decoding," IEEE 2000 Custom Integrated Circuits Conf., pp. 559-562 (May 2000).
Loomis et al., "VC-1 Technical Overview," 7 pp. (Apr. 2006) [Downloaded from the Internet on Jan. 24, 2007].
MainConcept, "MainConcept™ Showcase 2.8," 4 pp. (downloaded from the World Wide Web on Apr. 6, 2011).
Marpe et al., "A Fast Renormalization Technique for H.264/MPEG4-AVC Arithmetic Coding," 14 pp. (2006).
Murata et al., "Fast 2D IDCT Implementation with Multimedia Instructions for a Software MPEG2 Decoder," *Int'l Conf. on Acoustics, Speech, and Signal Processing*, vol. 5, pp. 3105-3108 (May 1998).
Narasimhan, "Contributions to Carriage of AVC in MPEG-2," ISO/IEC/JTC1/SC29/WG11, MPEG2003/m9448, 12 pp. (2003).
Notice of Acceptance dated Jan. 22, 2016, from New Zealand Patent Application No. 619046, 1 p.
Notice of Acceptance dated Jun. 26, 2016, from Chilean Patent Application No. 3736-2013, 1 p.
Notice of Acceptance dated Jul. 4, 2016, from Australian Patent Application No. 2011371809, 2 pp.
Notice of Allowance dated Apr. 17, 2015, from Mexican Patent Application No. MX/a/2013/015154, 1 p.
Notice of Allowance dated Jan. 14, 2016, from Russian Patent Application No. 2013158832, 1 p.
Notice of Allowance dated Nov. 8, 2016, from Japanese Patent Application No. 2014-518537, 3 pp.
Notification to Grant Patent Right dated Dec. 4, 2015, from Chinese Patent Application No. 201180071993.6, 4 pp.
Notice of Publication of the Registration and Grant of a Standard Patent dated May 19, 2017, from Hong Kong Patent Application No. 14108880.0, 1 p.
Oehring et al., "MPEG-2 Video Decompression on Simultaneous Multithreaded Multimedia," *Int. Conf on Parallel Architectures and Compilation Techniques* (PACT '99), Newport Beach, CA (Oct. 1999).
Office Action dated Jun. 30, 2015, from Colombian Patent Application No. 14-019170, 7 pp [no English translation available].
Office Action dated Oct. 9, 2015, from Japanese Patent Application No. 2014-518537, 4 pp.
Office Action dated Dec. 18, 2015, from Colombian Patent Application No. 14-019170, 8 pp.
Office Action dated Oct. 1, 2015, from Russian Patent Application No. 2013158832, 4 pp.
Office Action dated Apr. 9, 2017, from Israeli Patent Application No. 247175, 2 pp.
Official Letter and Search Report dated Aug. 31, 2015, from Taiwanese Patent Application No. 100136771, 14 pp.
Official Letter and Search Report dated Nov. 22, 2016, from Taiwanese Patent Application No. 105103519, 5 pp. [No English translation available].
Ostermann et al., "Video Coding with H.264/AVC: Tools, Performance, and Complexity," *IEEE Circuits and Systems Magazine*, pp. 7-28 (Aug. 2004).
Park et al., "On High-level Syntax for Maximum DPB Size and Frame Latency," JCTVC-G546, 4 pp. (Nov. 2011).
Park et al., "On High-level Syntax for Maximum DPB Size and Frame Latency (JCTVC-G546)," 8 pp. (Nov. 2011).
Patent Examination Report No. 1 dated Jan. 12, 2016, from Australian Patent Application No. 2011371809, 4 pp.

(56) References Cited

OTHER PUBLICATIONS

Prada-Rojas et al,. "Towards a Component-based Observation of MPSoC," *IEEE*, pp. 542-549 (Sep. 2009).
Rangan et al., "Continuity and Synchronization in MPEG," *IEEE Journal on Selected Areas in Communications*, vol. 14, No. 1, pp. 52-60 (Jan. 1996).
Resolution dated Apr. 28, 2016, from Columbian Patent Application No. 14-019170 (No English translation available), 4 pp.
Richardson, H.264 and MPEG-4 Video Compression: Video Coding for Next-generation Multimedia, Chapter 6, "H.264/MPEG4 Part 10," pp. 159-223 (Aug. 2003).
Sambe et al., "High-speed Distributed Video Transcoding for Multiple Rates and Formats," *IEICE Trans on Information and Systems*, vol. E88-D, Issue 8, pp. 1923-1931 (Aug. 2005).
Schwarz et al., "Overview of the Scalable H.264/MPEG4-AVC Extension," *IEEE Int'l Conf. on Image Processing*, pp. 161-164 (Oct. 2006).
Second Office action dated Jul. 30, 2015, from Chinese Patent Application No. 201180071993.6, 6 pp.
Second Official Action dated Sep. 14, 2015, from Chilean Patent Application No. 3736-2013, 5 pp. (English translation not available).
Segall et al., "Spatial Scalability Within the H.264/AVC Scalable Video Coding Extension," *IEEE Trans. on Circuits and Systems for Video Technology*, vol. 17, No. 9, pp. 1121-1135 (Sep. 2007).
Sjoberg, "On num_reorder_frames and max_dec_frame_buffering," JCTVC-E339, 4 pp. (Mar. 2011).
SMPTE, "Proposed SMPTE Standard for Television: VC-1 Compressed Video Bitstream Format and Decoding Process," SMPTE 421M, pp. i-xx, 5-7, 23-27 (Aug. 2005).
SMPTE, "VC-1 Compressed Video Bitstream Format and Decoding Process," SMPTE 421M-2006, 493 pp. (Feb. 2006).
Substantive Examination Report dated Nov. 4, 2016, from Philippine Patent Application No. 1-2013-502659, 2 pp.
Sullivan, "DirectX Video Acceleration Specification for H.264/AVC Decoding," 66 pp. (Dec. 2007—updated Dec. 2010).
Sullivan et al., "DirectX Video Acceleration Specification for H.264/MPEG-4 AVC Multiview Video Coding (MVC), Including the Stereo High Profile," 17 pp. (Mar. 2011).
Sullivan et al., "Microsoft DirectX VA: Video Acceleration API/DDI," 88 pp. (2001).
Sullivan, "Proposed Constraint on Reordering Latency," JCTVC-F541, 5 pp. (Jul. 2011).
Sullivan, "Proposed Constraint on Reordering Latency (for Further Consideration of JCTVC-F541)," JCTVC-G779, 5 pp. (Nov. 2011).
Supplementary Search Report dated Feb. 6, 2015, from European Patent Application No. 11868856.3, 9 pp.
Van Der Tol et al., "Mapping of MPEG-4 decoding on a flexible architecture platform," *Proceedings of the SPIE, Media Processors*, vol. 4674, 13 pp. (Jan. 2002).
Van Der Tol et al., "Mapping of H.264 Decoding on a Multiprocessor Architecture," *Proceedings of the SPIE*, vol. 5022, pp. 707-718 (May 2003).
Wang, "H.264 Baseline Video Implementation on the CT3400 Multi-core DSP," Cradle Technologies, 15 pp. (2006).
Wang, "[Mp4-tech] [H.264] Output Timing, Bumping Process, Missing HRD Parameters," downloaded from World Wide Web, 3 pp. (document marked May 5, 2006).
Wiegand et al., "Introduction to the Special Issue on Scalable Video Coding—Standardization and Beyond," *IEEE Trans. on Circuits and Systems Technology*, vol. 17, No. 9, pp. 1099-1102 (Sep. 2007).
Wikipedia, "Motion JPEG," 4 pp., downloaded from the World Wide Web on Dec. 29, 2010.
Written Opinion dated May 15, 2012, from International Patent Application No. PCT/US2011/055835, 4 pp.
Yadav et al., "Software-only Multiple Variable Length Decoding for Real-Time Video on MDSP," *Int'l Conf on Consumer Electronics*, pp. 141-142 (Jan. 2005).
Youssef, "JPEG and MPEG Standards," 14 pp., downloaded from the World Wide Web on Dec. 29, 2010.
"Non Final Office Action Issued in U.S. Appl. No. 13/270,969", dated Dec. 5, 2013, 18 Pages.
"Notice of Allowance Issued U.S. Appl. No. 13/270,969", dated May 13, 2014, 17 Pages.
"Final Office Action Issued in U.S. Appl. No. 14/458,997", dated Aug. 28, 2015, 32 Pages.
"Non Final Office Action Issued in U.S. Appl. No. 14/458,997", dated Jan. 16, 2015, 27 Pages.
"Notice of Allowance Issued in U.S. Appl. No. 14/458,997", dated Apr. 13, 2016, 10 Pages.
"Notice of Allowance Issued in U.S. Appl. No. 15/377,631", dated Apr. 28, 2017, 10 Pages.
"Corrected Notice of Allowance Issued in U.S. Appl. No. 14/458,997", dated Jul. 26, 2016, 2 Pages.
"Corrected Notice of Allowance Issued in U.S. Appl. No. 15/201,160", dated Jun. 14, 2017, 2 Pages.
"Notice of Allowance Issued in U.S. Appl. No. 15/201,160", dated Apr. 11, 2017, 10 Pages.
"Notice of Allowance Issued U.S. Appl. No. 15/201,160", dated Sep. 9, 2016, 9 Pages.
"Corrected Notice of Allowance Issued in U.S. Appl. No. 15/377,831", dated Jun. 14, 2017, 2 Pages.
"Office Action Issued in Indonesia Patent Application No. W00201305806", dated Feb. 20, 2017, 3 Pages.
"Notice of Allowance Issued in Canadian Patent Application No. 2840427", dated Jul. 14, 2017, 1 Page.
"Notice of Allowance Issued for South African Patent Application No. 2013/08553", dated Dec. 5, 2014, 1 Page.
"Decision of Patent Examination and Search Report for Taiwanese Patent Application No. 106113582", dated Sep. 30, 2017, 6 pages.

\* cited by examiner software 180 implementing one or more
innovations for reducing latency in encoding and decoding

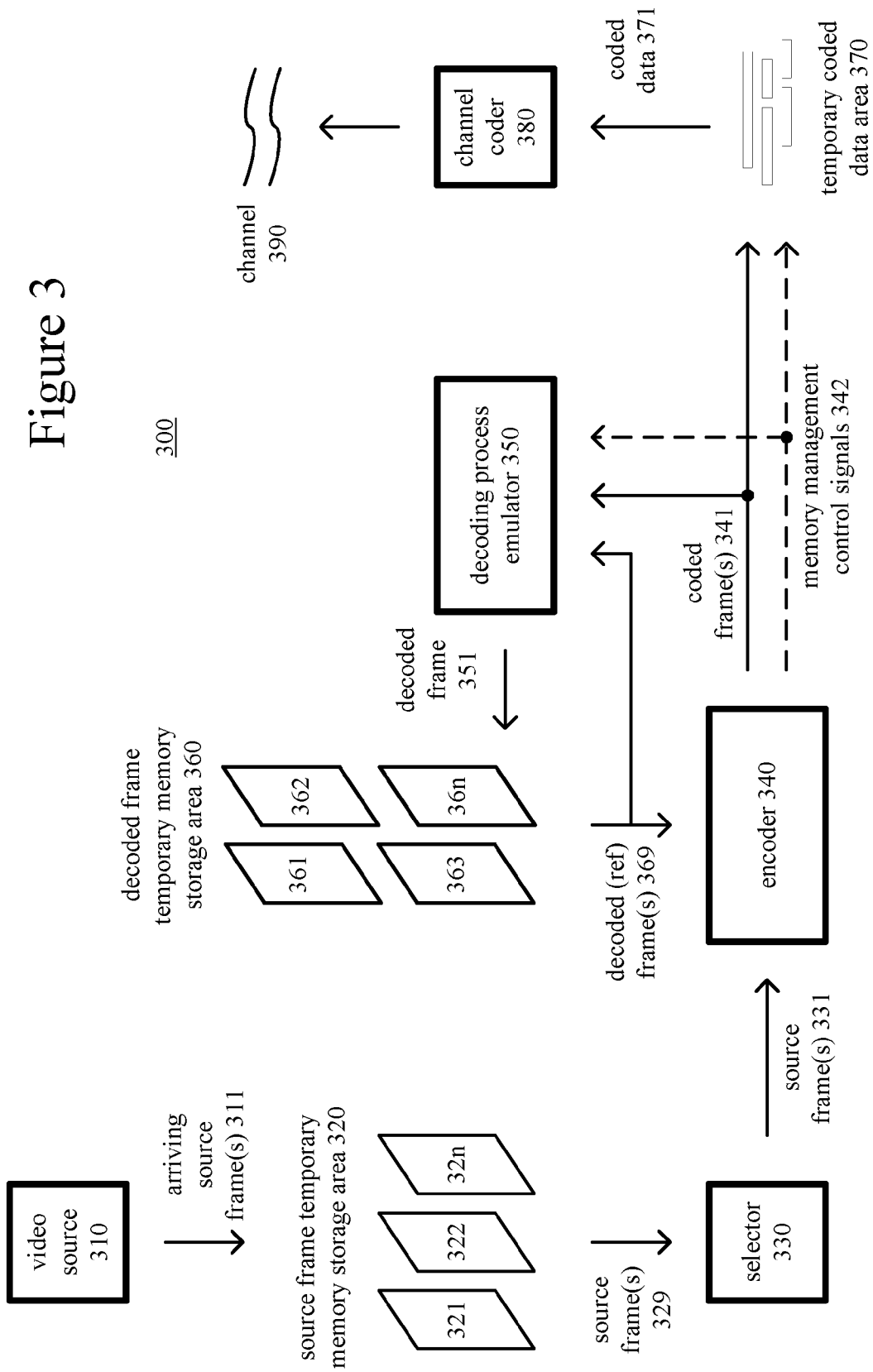

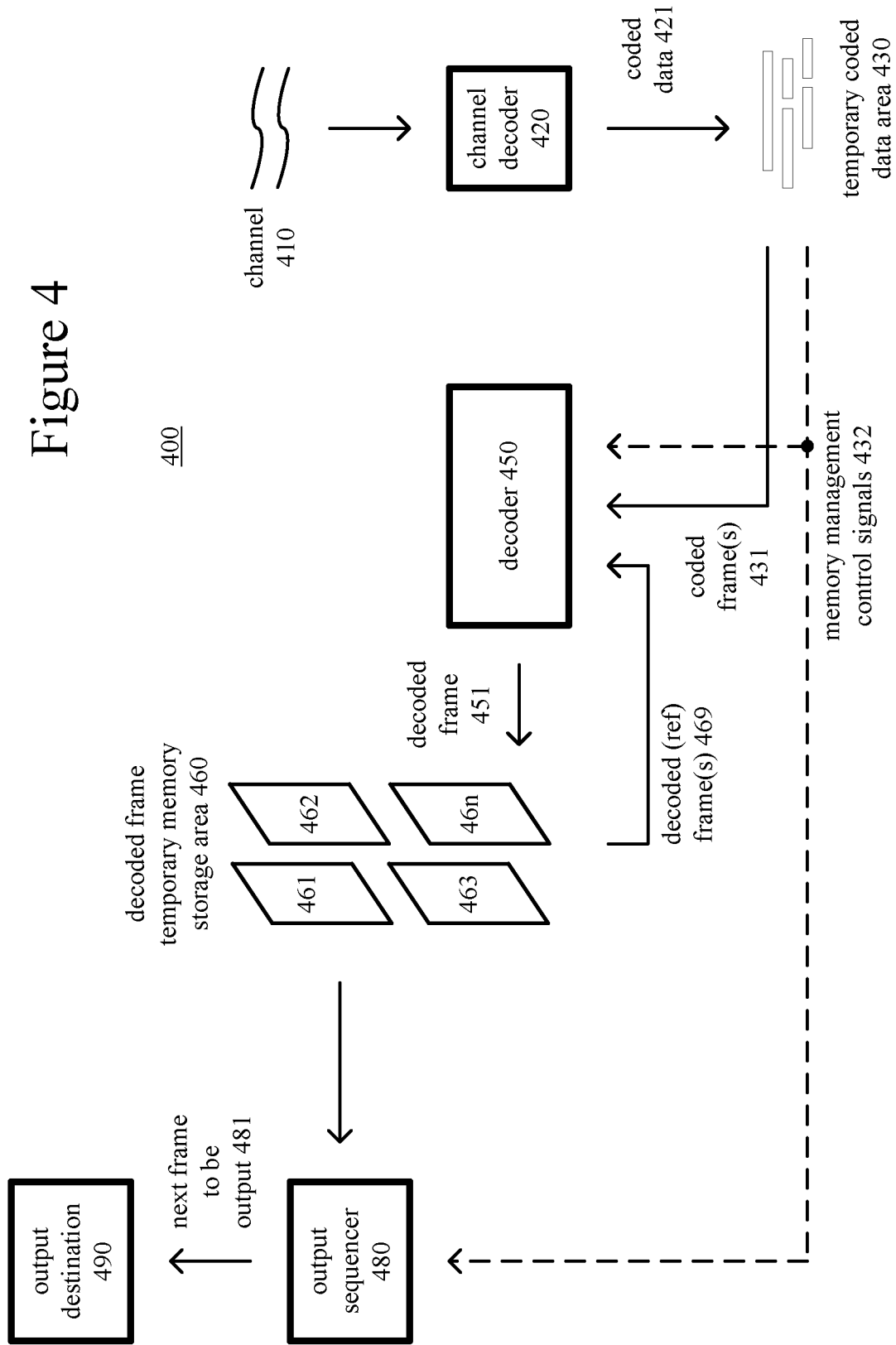

501

502

503

504

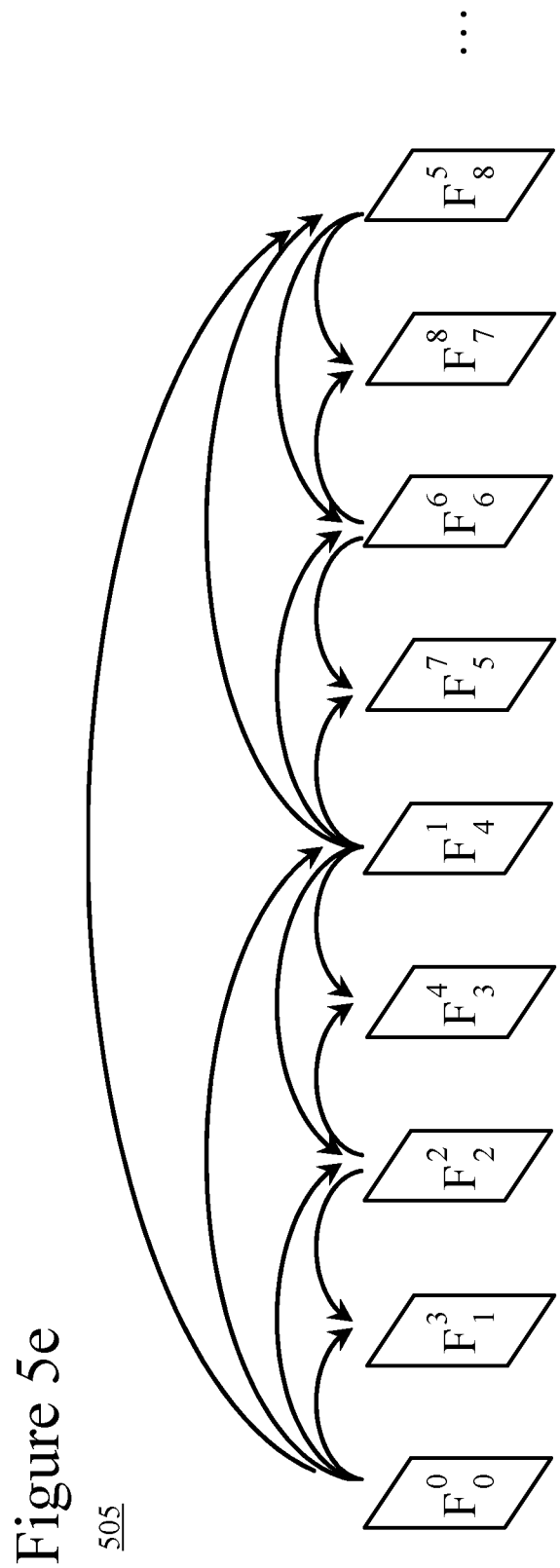

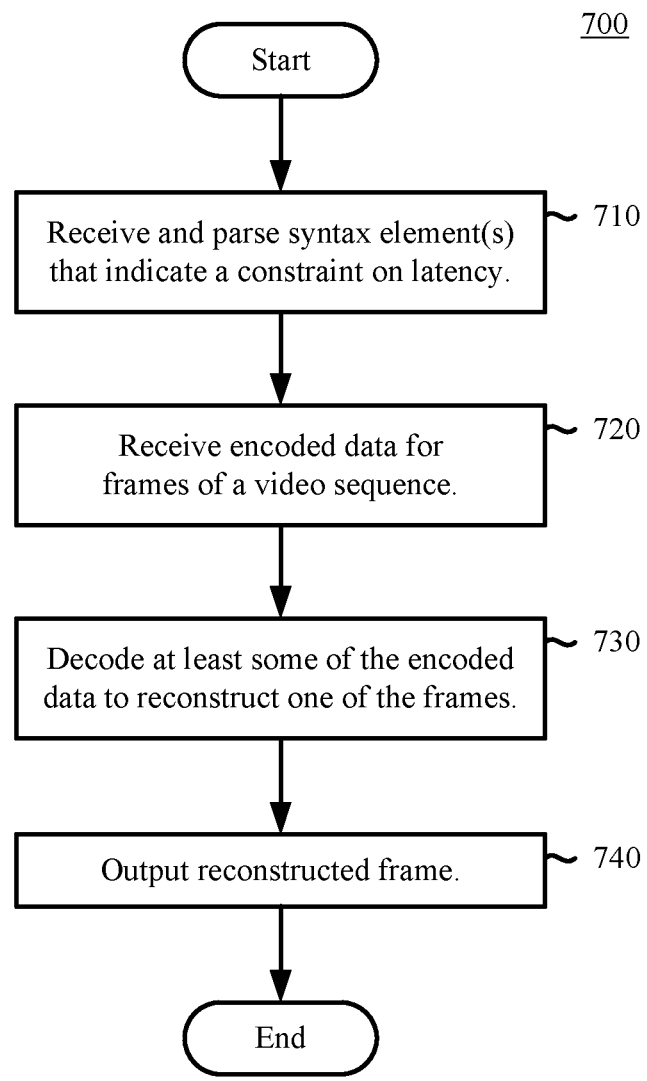

REDUCING LATENCY IN VIDEO ENCODING AND DECODING

RELATED APPLICATION

The present application is a continuation of U.S. patent application Ser. No. 15/201,160, filed Jul. 1, 2016, which is a continuation of U.S. patent application Ser. No. 14/458, 997, filed Aug. 13, 2014, now U.S. Pat. No. 9,426,495, which is a continuation of U.S. patent application Ser. No. 13/270,969, filed Oct. 11, 2011, now U.S. Pat. No. 8,837, 600, the disclosure of which is hereby incorporated by reference, which claims the benefit of U.S. Provisional Patent Application No. 61/571,553, filed Jun. 30, 2011, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. More recently, the HEVC standard is under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

A basic goal of compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, depending on the use scenario, considerations such as encoding time, encoding complexity, encoding resources, decoding time, decoding complexity, decoding resources, overall delay, and/or smoothness in playback also affect decisions made during encoding and decoding.

For example, consider use scenarios such as video playback from storage, video playback from encoded data streamed over a network connection, and video transcoding (from one bit rate to another bit rate, or one standard to another standard). At the encoder side, such applications may permit off-line encoding that is not at all time-sensitive. Therefore, an encoder can increase encoding time and increase resources used during encoding to find the most efficient way to compress video, and thereby improve rate-distortion performance. If a small amount of delay is also acceptable at the decoder side, the encoder can further improve rate-distortion performance, e.g., by exploiting inter-picture dependencies from pictures farther ahead in a sequence.

On the other hand, consider use scenarios such as remote desktop conferencing, surveillance video, video telephony and other real-time communication scenarios. Such applications are time-sensitive. Low latency between recording of input pictures and playback of output pictures is a key factor in performance. When encoding/decoding tools adapted for non-real-time communication are applied in real-time communication scenarios, overall latency is often unacceptably high. The delays that these tools introduce during encoding and decoding may improve performance for regular video playback, but they disrupt real-time communication.

SUMMARY

In summary, the detailed description presents techniques and tools for reducing latency in video encoding and decoding. The techniques and tools can reduce latency so as to improve responsiveness in real-time communication. For example, the techniques and tools reduce overall latency by constraining latency due to reordering of video frames, and by indicating the constraint on frame reordering latency with one or more syntax elements that accompany coded data for the video frames.

According to one aspect of the techniques and tools described herein, a tool such as a video encoder, real-time communication tool with a video encoder, or other tool, sets one or more syntax elements that indicate a constraint on latency (e.g., a constraint on frame reordering latency consistent with inter-frame dependencies between multiple frames of a video sequence). The tool outputs the syntax element(s), thereby facilitating simpler and quicker determination of when reconstructed frames are ready for output in terms of output order of the frames.

According to another aspect of the techniques and tools described herein, a tool such as a video decoder, real-time communication tool with a video decoder, or other tool, receives and parses one or more syntax elements that indicate a constraint on latency (e.g., a constraint on frame reordering latency). The tool also receives encoded data for multiple frames of a video sequence. At least some of the encoded data is decoded to reconstruct one of the frames. The tool can determine the constraint on latency based on the syntax element(s), then use the constraint on latency to determine when a reconstructed frame is ready for output (in terms of output order). The tool outputs the reconstructed frame.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 4 is a diagram of an example decoder system in conjunction with which some described embodiments can be implemented.

FIGS. 5a-5e are diagrams showing coded order and output order for frames in several example series.

FIG. 7 is a flowchart showing an example technique for reduced-latency decoding.

DETAILED DESCRIPTION

The detailed description presents techniques and tools for reducing latency in video encoding and decoding. The techniques and tools can help reduce latency so as to improve responsiveness in real-time communication.

In video coding/decoding scenarios, some delay is inevitable between the time an input video frame is received and the time the frame is played back. The frame is encoded by an encoder, delivered to a decoder and decoded by the decoder, and some amount of latency is caused by practical limitations on encoding resources, decoding resources and/or network bandwidth. Other latency is avoidable, however. For example, latency might be introduced by an encoder and decoder to improve rate-distortion performance (e.g., to exploit inter-frame dependencies from pictures farther ahead in a sequence). Such latency can be reduced, although there may be a penalty in terms of rate-distortion performance, processor utilization or playback smoothness.

With techniques and tools described herein, latency is decreased by constraining latency (hence, limiting the temporal extent of inter-frame dependencies) and indicating the constraint on latency to a decoder. For example, the constraint on latency is a constraint on frame reordering latency. Alternatively, the constraint on latency is a constraint in terms of seconds, milliseconds, or another time measure. The decoder can then determine the constraint on latency and use the constraint when determining which frames are ready for output. In this way, delay can be reduced for remote desktop conferencing, video telephony, video surveillance, web camera video and other real-time communication applications.

Some of the innovations described herein are illustrated with reference to syntax elements and operations specific to the H.264 and/or HEVC standard. Such innovations can also be implemented for other standards or formats.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of latency reduction for video encoding and decoding can be used in combination or separately. Different embodiments use one or more of the described techniques and tools. Some of the techniques and tools described herein address one or more of the problems noted in the background. Typically, a given technique/tool does not solve all such problems.

I. Example Computing Systems

Figure 1:
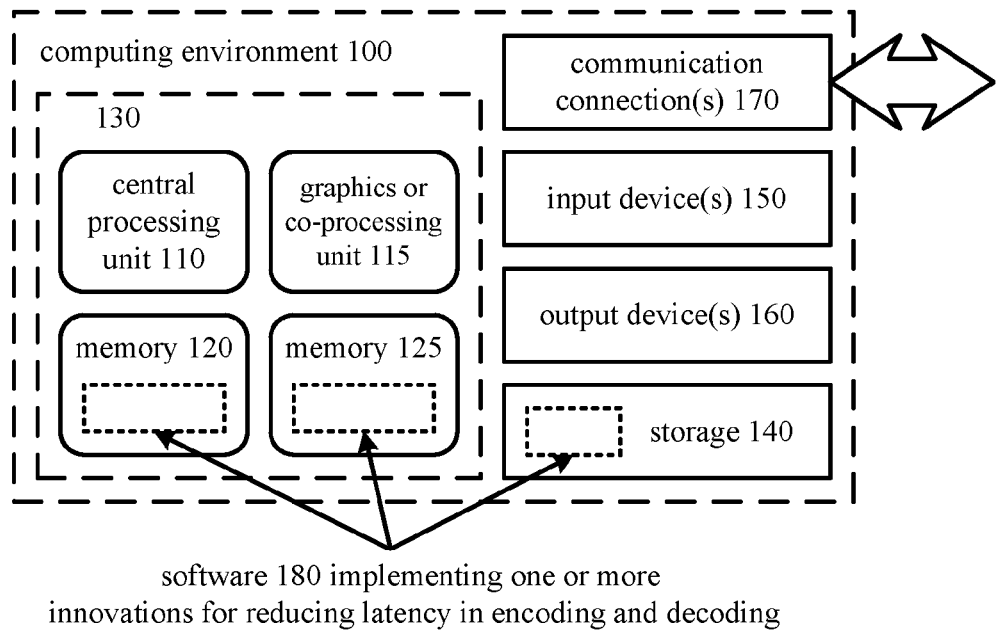
FIG. 1 is a diagram of an example computing system in which some described embodiments can be implemented.

FIG. 1 illustrates a generalized example of a suitable computing system (100) in which several of the described techniques and tools may be implemented. The computing system (100) is not intended to suggest any limitation as to scope of use or functionality, as the techniques and tools may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for reducing latency in video encoding and decoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for latency reduction in video encoding and decoding.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The techniques and tools can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The techniques and tools can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
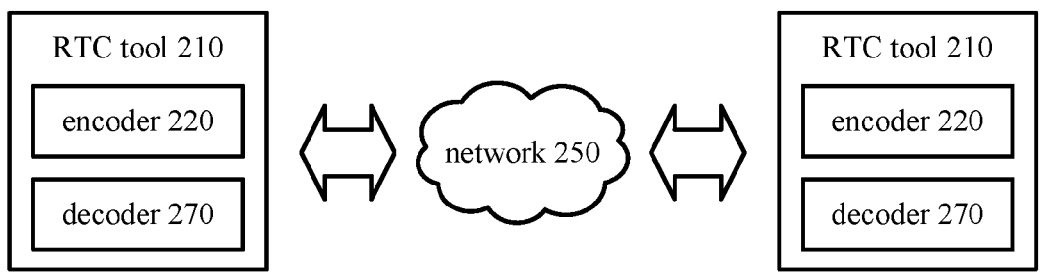
FIGS. 2a and 2b are diagrams of example network environments in which some described embodiments can be implemented.
Figure 2B:
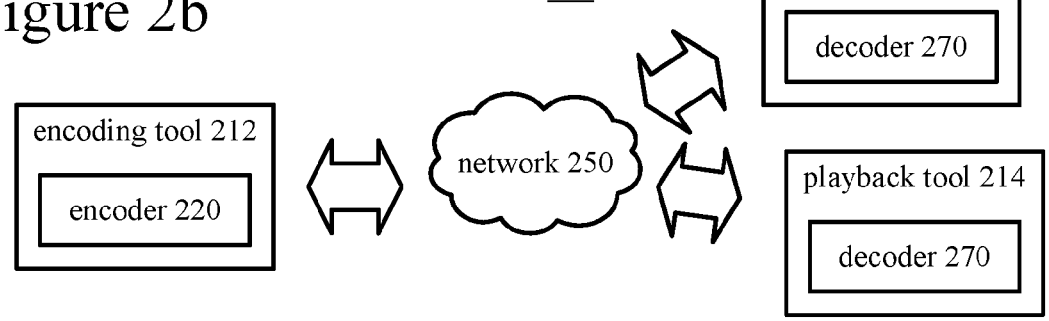

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO-IEC 14496-10 standard (also known as H.264 or AVC), HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

In some cases, the use of a syntax element to indicate latency (e.g., frame reordering latency) is specific to a particular standard or format. For example, encoded data can contain one or more syntax elements that indicate a constraint on latency as part of the syntax of an elementary coded video bitstream defined according to the standard or format, or as defined media metadata relating to the encoded data. In such cases, the real-time communication tool (210), encoding tool (212) and/or playback tool (214) with reduced latency may be codec dependent, in that decisions they make can depend on bitstream syntax for a particular standard or format.

In other cases, the use of a syntax element to indicate a constraint on latency (e.g., frame reordering latency) is outside a particular standard or format. For example, syntax element(s) that indicate a constraint on latency can be signaled as part of the syntax of a media transmission stream, media storage file or, more generally, a media system multiplexing protocol or transport protocol. Or, syntax element(s) that indicate latency can be negotiated between real-time communication tools (210), encoding tools (212) and/or playback tools (214) according to a media property negotiation protocol. In such cases, the real-time communication tool (210), encoding tool (212) and playback tool (214) with reduced latency may be codec independent, in that they can work with any available video encoder and decoder, assuming a level of control over inter-frame dependencies set during encoding.

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include one or more syntax elements that indicate a constraint on latency (e.g., frame reordering latency) to facilitate reduced-latency decoding.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding.

The encoder (340) encodes the selected frame (331) to produce a coded frame (341) and also produces memory management control signals (342). If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format or other format.

The coded frames (341) and memory management control signals (342) are processed by a decoding process emulator (350). The decoding process emulator (350) implements some of the functionality of a decoder, for example, decoding tasks to reconstruct reference frames that are used by the encoder (340) in motion estimation and compensation. The decoding process emulator (350) uses the memory management control signals (342) to determine whether a given coded frame (341) needs to be reconstructed and stored for use as a reference frame in inter-frame prediction of subsequent frames to be encoded. If the control signals (342) indicate that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the memory management control signals (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and memory management control signals (342) are also buffered in a temporary coded data area (370). The coded data that is aggregated in the coded data area (370) can contain, as part of the syntax of an elementary coded video bitstream, one or more syntax elements that indicate a constraint on latency. Or, the coded data that is aggregated in the coded data area (370) can include syntax element(s) that indicate a constraint on latency as part of media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream, in which case the channel encoder (380) can add, as part of the syntax of the media transmission stream, syntax element(s) that indicate a constraint on latency. Or, the channel encoder (380) can organize the aggregated data for storage as a file, in which case the channel encoder (380) can add, as part of the syntax of the media storage file, syntax element(s) that indicate a constraint on latency. Or, more generally, the channel encoder (380) can implement one or more media system multiplexing protocols or transport protocols, in which case the channel encoder (380) can add, as part of the syntax of the protocol(s), syntax element(s) that indicate a constraint on latency. The channel encoder (380) provides output to a channel (390), which represents storage, a communications connection, or another channel for the output.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include one or more syntax elements that indicate a constraint on latency (e.g., frame reordering latency) to facilitate reduced-latency decoding.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream, in which case the channel decoder (420) can parse, as part of the syntax of the media transmission stream, syntax element(s) that indicate a constraint on latency. Or, the channel decoder (420) separates coded video data that has been aggregated for storage as a file, in which case the channel decoder (420) can parse, as part of the syntax of the media storage file, syntax element(s) that indicate a constraint on latency. Or, more generally, the channel decoder (420) can implement one or more media system demultiplexing protocols or transport protocols, in which case the channel decoder (420) can parse, as part of the syntax of the protocol(s), syntax element(s) that indicate a constraint on latency.

The coded data (421) that is output from the channel decoder (420) is stored in a temporary coded data area (430) until a sufficient quantity of such data has been received. The coded data (421) includes coded frames (431) and memory management control signals (432). The coded data (421) in the coded data area (430) can contain, as part of the syntax of an elementary coded video bitstream, one or more syntax elements that indicate a constraint on latency. Or, the coded data (421) in the coded data area (430) can include syntax element(s) that indicate a constraint on latency as part of media metadata relating to the encoded video data (e.g., as one or more parameters in one or more SEI messages or VUI messages). In general, the coded data area (430) temporarily stores coded data (421) until such coded data (421) is used by the decoder (450). At that point, coded data for a coded frame (431) and memory management control signals (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms and motion compensation. The exact operations performed by the decoder (450) can vary depending on compression format.

The decoded frame temporary memory storage area (460) includes multiple frame buffer storage areas (461, 462, . . . , 46n). The decoded frame storage area (460) is an example of a decoded picture buffer. The decoder (450) uses the memory management control signals (432) to identify a frame buffer (461, 462, etc.) in which it can store a decoded frame (451). The decoder (450) stores the decoded frame (451) in that frame buffer.

An output sequencer (480) uses the memory management control signals (432) to identify when the next frame to be produced in output order is available in the decoded frame storage area (460). To reduce latency of the encoding-decoding system, the output sequencer (480) uses syntax elements that indicate constraints on latency to expedite identification of frames to be produced in output order. When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Syntax Elements that Facilitate Reduced-Latency Encoding and Decoding

In most video codec systems, the coded order (also called the decoding order or bitstream order) is the order in which video frames are represented in coded data in a bitstream and, hence, processed during decoding. The coded order may differ from the order in which the frames are captured by a camera before encoding and differ from the order in which decoded frames are displayed, stored, or otherwise output after decoding (output order or display order). Reordering of frames relative to the output order has benefits (primarily in terms of compression capability), but it increases the end-to-end latency of encoding and decoding processes.

Techniques and tools described herein reduce latency due to reordering of video frames and, by providing information about constraints on the reordering latency to decoder systems, also facilitate latency reduction by the decoder systems. Such latency reduction is useful for many purposes. For example, it can be used to reduce the time lag that occurs in interactive video communication using a video conferencing system, so that the conversation flow and interactivity of communication between remote participants will be more rapid and natural.

A. Approaches to Output Timing and Output Ordering

According to the H.264 standard, a decoder can use two approaches to determine when a decoded frame is ready to be output. A decoder can use timing information in the form of decoding timestamps and output timestamps (e.g., as signaled in picture timing SEI messages). Or, the decoder can use buffering capacity limits signaled with various syntax elements to determine when a decoded frame is ready to be output.

Timing information can be associated with each decoded frame. The decoder can use timing information to determine when a decoded frame can be output. In practice, however, such timing information may be unavailable to a decoder. Moreover, even when timing information is available, some decoders do not actually use this information (e.g., because a decoder has been designed to work regardless of whether timing information is available).

Buffering capacity limits are indicated with several syntax elements according to the H.264 standard (and draft versions of the HEVC standard), including the syntax element max_dec_frame_buffering, the syntax element num_reorder_frames, relative ordering information (termed "picture order count" information) and other memory management control information signaled in the bitstream. The syntax element max_dec_frame_buffering (or the derived variable specified as MaxDpbFrames) specifies the required size of a decoded picture buffer ("DPB") in units of frame buffers. As such, the syntax element max_dec_frame_buffering expresses a top-level memory capacity used for a coded video sequence, so as to enable a decoder to output pictures in the correct order. The syntax element num_reorder_frames (or max_num_reorder_frames) indicates the maximum number of frames (or complementary field pairs, or non-paired fields) that can precede any frame (or complementary field pair, or non-paired field) in coded order and follow it in output order. In other words, num_reorder_ frames specifies a constraint on the memory capacity necessary for picture reordering. The syntax element max_num_ ref_frames specifies the maximum number of short-term and long-term reference frames (or complementary reference field pairs, or non-paired reference fields) that may be used by the decoding process for inter prediction of any picture in the sequence. The syntax element max_num_ref_ frames also determines the size of the sliding window for decoded reference picture marking. Like num_reorder_ frames, max_num_ref_frames specifies a constraint on required memory capacity.

A decoder uses the max_dec_frame_buffering (or MaxDpbFrames) and num_reorder_frames syntax elements to determine when a buffering capacity limit has been exceeded. This happens, for example, when a new decoded frame needs to be stored in the DPB, but there is no available space remaining in the DPB. In this situation, the decoder uses picture order count information to identify, among the pictures that have been decoded, which is the earliest in output order. The picture that is earliest in output order is then output. Such processing is sometimes called "bumping" because a picture is "bumped out" of the DPB by the arrival of a new picture that needs to be stored.

Information indicated with the max_dec_frame_buffering (or MaxDpbFrames) and num_reorder_frames syntax elements suffices for determining memory capacity needed in a decoder. When used to control the "bumping" process for picture output, however, use of such information can introduce latency unnecessarily. As defined in the H.264 standard, the max_dec_frame_buffering and num_reorder_ frames syntax elements do not establish a limit on the amount of reordering that can be applied to any particular picture and, hence, do not establish a limit on end-to-end latency. Regardless of the values of these syntax elements, a particular picture can be kept in the DPB for an arbitrarily long time before it is output, which corresponds to substantial latency added by pre-buffering of the source pictures by an encoder.

B. Syntax Elements that Indicate Constraints on Frame Reordering Latency

Techniques and tools described herein reduce latency in a video communication system. An encoding tool, real-time communication tool, or other tool sets a limit on the extent of reordering that can be applied to any frame in a coded video sequence. For example, the limit is expressed as a number of frames that can precede any given frame in a coded video sequence in output order and follow it in coded order. The limit constrains the reordering latency allowed for any particular frame in the sequence. Stated differently, the limit constrains the temporal extent of reordering (in terms of frames) between coded order and output order that can be applied to any particular frame. Limiting the extent of reordering helps reduce end-to-end delay. Also, establishing such a limit can be useful in real-time system negotiation protocols or application specifications for use scenarios in which reducing latency is important.

One or more syntax elements indicate the constraint on frame reordering latency. Signaling a constraint on frame reordering latency facilitates system-level negotiation for interactive real-time communication or other use scenarios. It provides a way to directly express constraints on frame reordering latency and characterize properties of a media stream or session.

A video decoder can use an indicated constraint on frame reordering latency to enable reduced-latency output of decoded video frames. In particular, compared to frame "bumping" processes, signaling a constraint on frame reordering latency enables a decoder to more simply and quickly identify frames in a DPB that are ready to be output. For example, a decoder can determine the latency status of a frame in the DPB by computing the difference between coded order for the frame and output order. By comparing the latency status of the frame to the constraint on frame reordering latency, a decoder can determine when the constraint on frame reordering latency has been reached. The decoder can immediately output any frame that has reached this limit. This can help the decoder more rapidly identify frames that are ready for output, compared to "bumping" processes that use a variety of syntax elements and tracking structures. In this way, the decoder can rapidly (and earlier) determine when a decoded frame can be output. The more rapidly (and earlier) the decoder can identify when frames can be output, the more rapidly (and earlier) the decoder can output video to a display or subsequent processing stages.

Thus, using the constraint on frame reordering latency, a decoder can begin output of frames from the decoded frame storage area before the decoded frame storage area is full, but still provide conformant decoding (i.e., decoding all frames such that the frames are bit-exact matches of frames decoded using another, conventional scheme). This significantly reduces delay when the delay (in frames) indicated by the latency syntax element is much lower than the size (in frames) of the decoded frame storage area.

FIGS. 5a-5e illustrate series (501-505) of frames having different inter-frame dependencies. The series are characterized by different values for (1) the constraint on the memory capacity necessary for picture reordering (that is, the number of frame buffers used to store reference frames for purposes of reordering, e.g., as indicated with a syntax element num_reorder_frames, and (2) a constraint on frame reordering latency, e.g., as specified by a variable MaxLatencyFrames. In FIGS. 5a-5e, for a given frame $F_j^k$ the subscript j indicates position of the frame in output order and the superscript k indicates position of the frame in coded order. The frames are shown in output order—the output order subscript value increases from left to right. Arrows illustrate inter-frame dependencies for motion compensation, according to which preceding frames in coded order are used for prediction of subsequent frames in coded order. For simplicity, FIGS. 5a-5e show inter-frame dependencies at the frame level (and not at the level of macroblocks, blocks, etc. at which reference frames can change), and FIGS. 5a-5e show at most two frames as reference frames for a given frame. In practice, in some implementations, different macroblocks, blocks, etc. in a given frame can use different reference frames, and more than two reference frames can be used for the given frame.

Figure 5A:
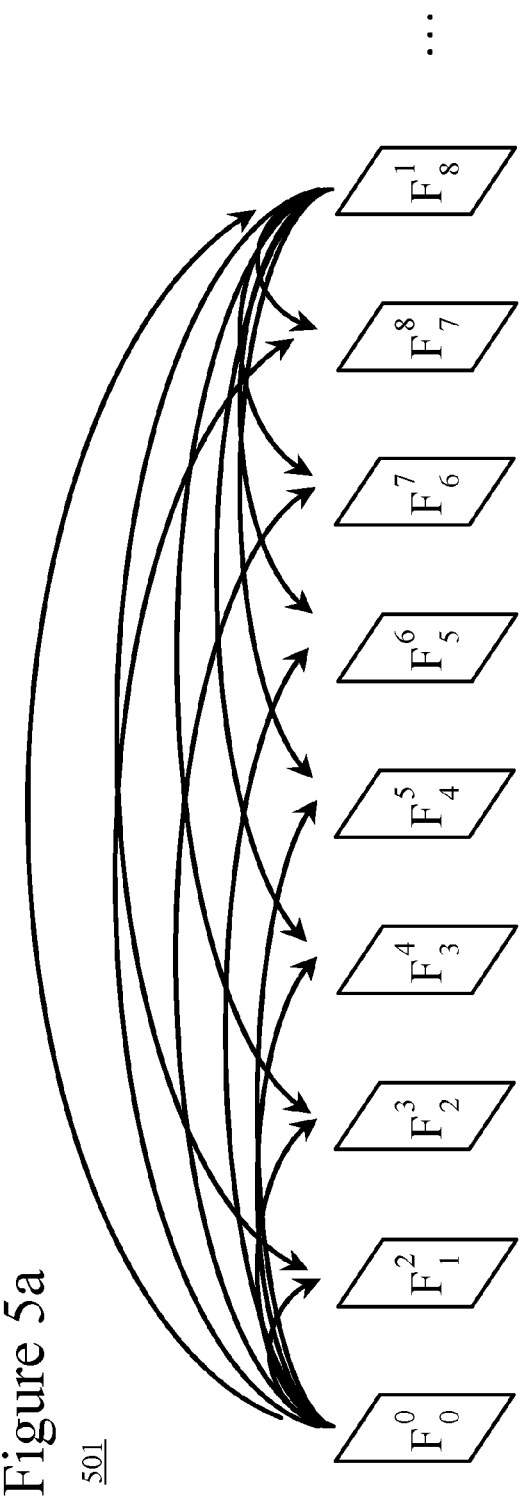

In FIG. 5a, the series (501) includes nine frames. The last frame $F_8^1$ in output order uses the first frame $F_0^0$ as a reference frame. The other frames in the series (501) use both the last frame $F_8^1$ and first frame $F_0^0$ as reference frames. This means the frame $F_0^0$ is decoded first, followed by the frame $F_8^1$, followed by the frame $F_1^2$, etc. In the series (501) shown in FIG. 5a, the value of num_reorder_frames is 1. At any point in the processing of the decoder system, among the frames shown in FIG. 5a, there is only one frame ($F_8^1$) stored in the decoded frame storage area for reordering purposes. (The first frame $F_0^0$ is also used as a reference frame and is stored, but is not stored for reordering purposes. Because the output order for the first frame $F_0^0$ is less than the output order of the intermediate frames, the first frame $F_0^0$ is not counted for purposes of num_reorder_frames.) Despite the low value for num_reorder_frames, the series (501) has a relatively high latency—the value of MaxLatencyFrames is 7. After encoding the first frame $F_0^0$, the encoder waits until it has buffered eight more source frames before encoding the next frame $F_1^2$ in output order, because the next frame $F_1^2$ depends on the last frame $F_8^1$ in the series (501). The value of MaxLatencyFrames is effectively the maximum allowed difference between the subscript value and the superscript value for any particular coded frame.

Figure 5B:
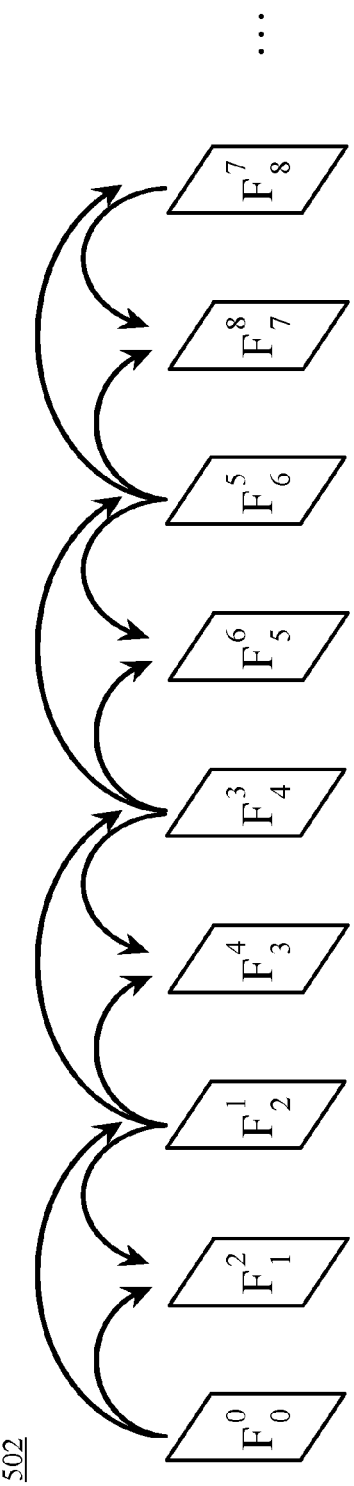

In FIG. 5b, the series (502) includes nine frames, as in the series (501) of FIG. 5a, but the inter-frame dependencies are different. Temporal reordering of frames occurs over short extents. As a result, the series (502) has a much lower latency—the value of MaxLatencyFrames is 1. The value of num_reorder_frames is still 1.

Figure 5C:
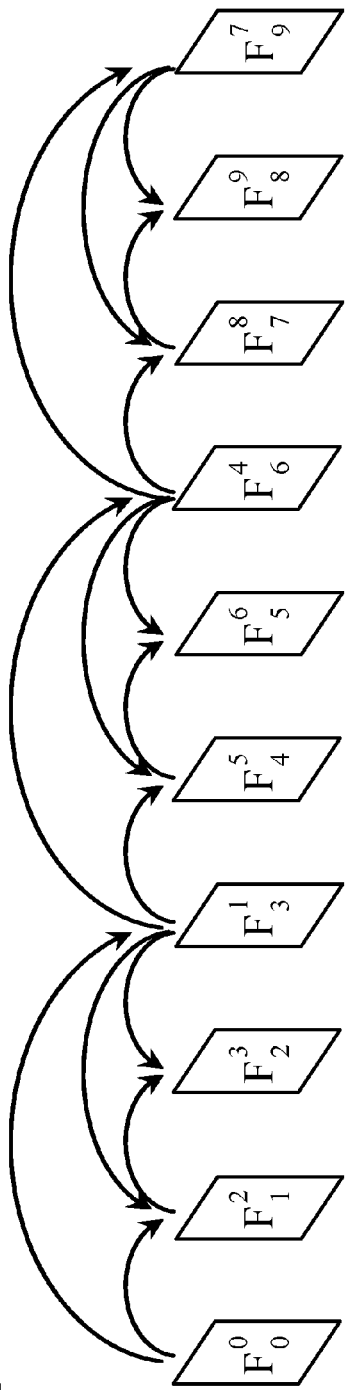

In FIG. 5c, the series (503) includes ten frames. The longest inter-frame dependency is shorter (in temporal extent) than the longest inter-frame dependency in FIG. 5a, but longer than the longest inter-frame dependency in FIG. 5b. The series (503) has the same low value of 1 for num_reorder_frames, and it has a relatively low value of 2 for MaxLatencyFrames. The series (503) therefore allows a lower end-to-end latency than the series (501) of FIG. 5a, although not as low as the allowable latency of the series (502) of FIG. 5b.

Figure 5D:
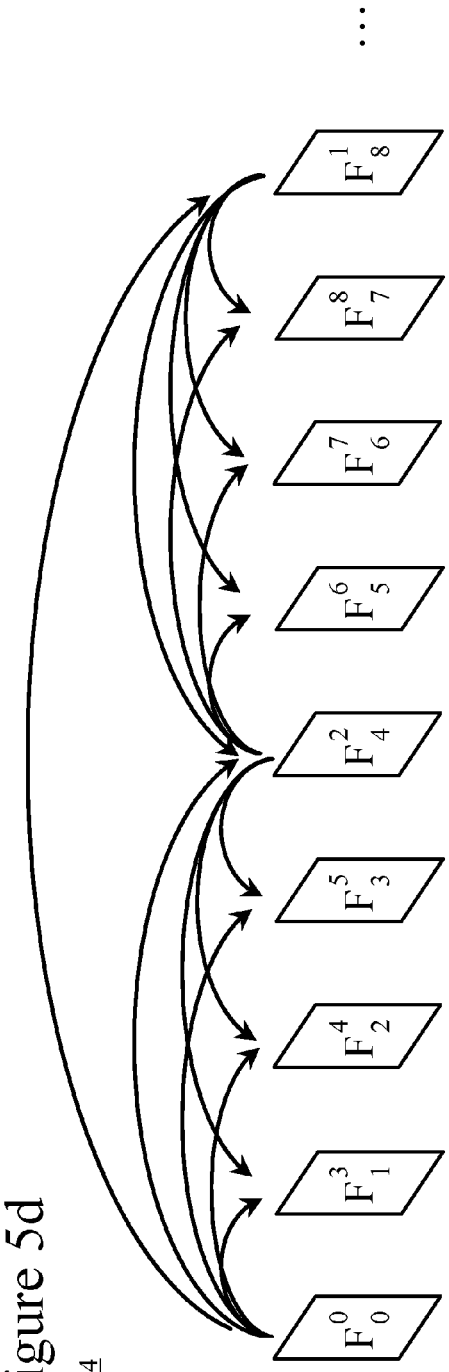

In FIG. 5d, the series (504) includes frames organized in a temporal hierarchy with three temporal layers according to inter-frame dependencies. The lowest temporal resolution layer includes the first frame $F_0^0$ and last frame $F_8^1$. The next temporal resolution layer adds the frame $F_4^2$, which depends on the first frame $F_0^0$ and last frame $F_8^1$. The highest temporal resolution layer adds the remaining frames. The series (504) shown in FIG. 5d has a relatively low value of 2 for num_reorder_frames but a relatively high value of 7 for MaxLatencyFrames, at least for the highest temporal resolution layer, due to the difference between coded order and output order for the last frame $F_8^1$. If only the intermediate temporal resolution layer or lowest temporal resolution layer is decoded, the constraint on frame reordering delay can be reduced to 1 (for the intermediate layer) or 0 (for the lowest layer). To facilitate reduced-latency decoding at various temporal resolutions, syntax elements can indicate constraints on frame reordering latency for different layers in a temporal hierarchy.

In FIG. 5e, the series (505) includes frames organized in a temporal hierarchy with three temporal layers according to different inter-frame dependencies. The lowest temporal resolution layer includes the first frame $F_0^0$, middle frame $F_4^1$ and last frame $F_8^5$. The next temporal resolution layer adds the frames $F_2^2$ (which depends on the first frame $F_0^0$ and middle frame $F_4^1$) and $F_6^6$ (which depends on the middle frame $F_4^1$ and last frame $F_8^5$). The highest temporal resolution layer adds the remaining frames. Compared to the series (504) of FIG. 5d, the series (505) of FIG. 5e still has a relatively low value of 2 for num_reorder_frames but has a lower value of 3 for MaxLatencyFrames, at least for the highest temporal resolution layer, due to the difference between coded order and output order for the middle frame $F_4^1$ and last frame $F_8^5$. If only the intermediate temporal resolution layer or lowest temporal resolution layer is decoded, the constraint on frame reordering delay can be reduced to 1 (for the intermediate layer) or 0 (for the lowest layer).

In the examples shown in FIGS. 5a-5e, if the value of MaxLatencyFrames is known, a decoder can identify certain frames as being ready for immediate output upon receipt of the preceding frame in output order. For a given frame, the frame's output order value minus the frame's coded order value may be equal to the value of MaxLatencyFrames. In this case, the given frame is ready for output as soon as the frame preceding it in output order is received. (In contrast, such frames could not be identified as ready for output using num_reorder_frames alone until additional frames were received or the end of the sequence was reached.) In particular, a decoder can use the value of MaxLatencyFrames to enable earlier output of the following frames:

In the series (501) of FIG. 5a, the frame $F_8^1$.
In the series (502) of FIG. 5b, the frames $F_2^1$, $F_4^3$, $F_6^5$, and $F_8^7$.
In the series (503) of FIG. 5c, the frames $F_3^1$, $F_6^4$, and $F_9^7$.
In the series (504) of FIG. 5d, the frame $F_8^1$.
In the series (505) of FIG. 5e, the frames $F_4^1$, and $F_8^5$.

In addition, declaration or negotiation of the value of MaxLatencyFrames at the system level can provide a summary expression of the latency characteristics of the bitstream or session in a way that is not enabled by measurement of reordering storage capacity and indication of such capacity using num_reorder_frames.

C. Example Implementations

Syntax elements that indicate a constraint on frame reordering latency can be signaled in various ways, depending on implementation. The syntax elements can be signaled as part of a sequence parameter set ("SPS"), picture parameter set ("PPS"), or other element of the bitstream, signaled as part of SEI messages, VUI messages or other metadata, or signaled in some other way. In any of the implementations, a syntax element indicating a constraint value can be encoded using unsigned exponential-Golomb coding, some other form of entropy coding, or fixed length coding, then signaled. A decoder performs corresponding decoding after receiving the syntax element.

In a first implementation, a flag max_latency_limitation_flag is signaled. If the flag has a first binary value (e.g., 0), no constraint on frame reordering latency is imposed. In this case, the value of a max_latency_frames syntax element is not signaled or is ignored. Otherwise (the flag having a second binary value such as 1), the value of a max_latency_frames syntax element is signaled to indicate the constraint on frame reordering latency. For example, in this case, the value signaled for the max_latency_frames syntax element can be any non-negative integer value.

In a second implementation, a syntax element max_latency_frames_plus1 is signaled to indicate the constraint on frame reordering latency. If max_latency_frames_plus1 has a first value (e.g., 0), no constraint on frame reordering latency is imposed. For other values (e.g., non-zero values), the value of the constraint on frame reordering latency is set to max_latency_frames_plus1−1. For example, the value of max_latency_frames_plus1 is in the range of 0 to $2^{32}-2$, inclusive.

Similarly, in a third implementation, a syntax element max_latency_frames is signaled to indicate the constraint on frame reordering latency. If max_latency_frames has a first value (e.g., a maximum value), no constraint on frame reordering latency is imposed. For other values (e.g., values less than the maximum value), the value of the constraint on frame reordering latency is set to max_latency_frames.

In a fourth implementation, the constraint on frame reordering latency is indicated relative to a maximum size of frame memory. For example, the latency constraint is signaled as an increase relative to the num_reorder_frames syntax element. Ordinarily, the constraint on frame reordering latency (in terms of frames) is greater than or equal to num_reorder_frames. To save bits in signaling of the latency constraint, the difference between the latency constraint and num_reorder_frames is encoded (e.g., using unsigned exponential-Golomb coding, some other form of entropy coding) then signaled. A syntax element max_latency_increase_plus1 is signaled to indicate the constraint on frame reordering latency. If max_latency_increase_plus1 has a first value (e.g., 0), no constraint on frame reordering latency is imposed. For other values (e.g., non-zero values), the value of the constraint on frame reordering latency is set to num_reorder_frames+max_latency_increase_plus−1. For example, the value of max_latency_increase_plus1 is in the range of 0 to $2^{32}-2$, inclusive.

Alternatively, one or more syntax elements that indicate a constraint on frame reordering latency are signaled in some other way.

D. Other Ways of Indicating Constraints on Latency

In many of the preceding examples, the constraint on latency is a constraint on frame reordering latency that is expressed in terms of a count of frames. More generally, the constraint on latency is a constraint on delay that can be expressed in terms of a frame count or expressed in terms of seconds, milliseconds or another time measure. For example, the constraint on latency can be expressed as an absolute time measure such as 1 second or 0.5 seconds. An encoder can convert such a time measure to a count of frames (considering the frame rate of video), then encode the video such that inter-frame dependencies between multiple frames of a video sequence are consistent with the frame count. Or, regardless of frame reordering and inter-frame dependencies, the encoder can use the time measure to limit the extent to which delay is used to smooth out short-term fluctuations in bit rate of encoded video, encoding complexity, network bandwidth, etc. A decoder can use the time measure to determine when a frame can be output from a decoded picture buffer.

The constraint on latency can be negotiated between a transmitter side and receiver side so as to trade-off responsiveness (lack of delay) with ability to smooth out short-term fluctuations in bit rate of encoded video, ability to smooth out short-term fluctuations in encoding complexity, ability to smooth out short-term fluctuations in network bandwidth and/or another factor that benefits from increased delay. In such negotiations, it may be helpful to establish and characterize the constraint on latency in a way that is independent of frame rate. The constraint can then be applied during encoding and decoding, considering the frame rate of the video. Or, the constraint can be applied during encoding and decoding regardless of the frame rate of the video.

E. Generalized Techniques for Setting and Outputting Syntax Elements

Figure 6:
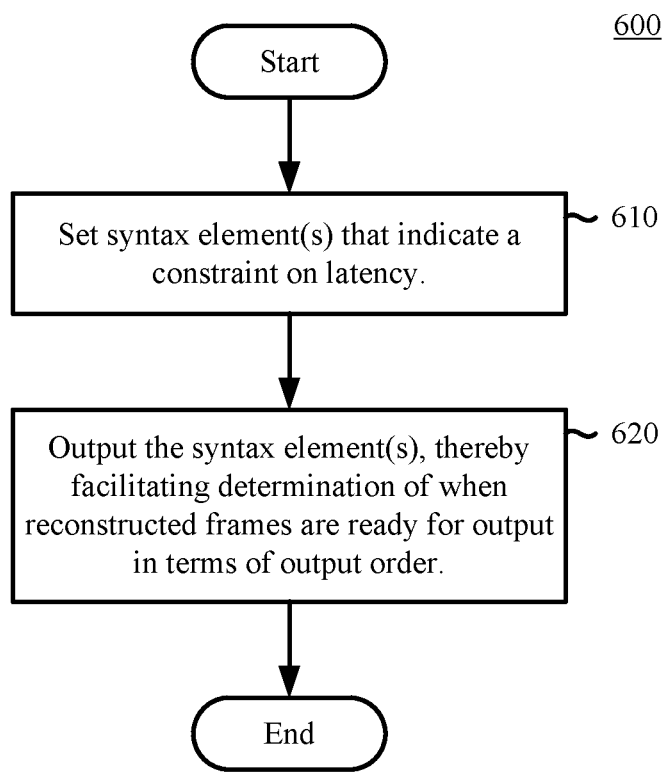
FIG. 6 is a flowchart showing an example technique for setting and outputting one or more syntax elements that indicate a constraint on latency.

FIG. 6 shows an example technique (600) for setting and outputting syntax elements that facilitate reduced-latency decoding. For example, a real-time communication tool or encoding tool described with reference to FIGS. 2a and 2b performs the technique (600). Alternatively, another tool performs the technique (600).

To start, the tool sets (610) one or more syntax elements that indicate a constraint on latency (e.g., frame reordering latency, latency in terms of a time measure) consistent with inter-frame dependencies between multiple frames of a video sequence. When the tool includes a video encoder, the same tool can also receive the frames, encode the frames to produce encoded data (using the inter-frame dependencies that are consistent with the constraint on frame reordering latency), and output the encoded data for storage or transmission.

Typically, a constraint on frame reordering latency is a reordering latency allowed for any frame in the video sequence. The constraint can be expressed in various ways, however, and have various other meanings. For example, the constraint can be expressed in terms of a maximum count of frames that can precede a given frame in output order but follow the given frame in coded order. Or, the constraint can be expressed as a maximum difference between coded order and output order for any frame in the video sequence. Or, focusing on an individual frame, the constraint can be expressed as the reordering latency associated with a given, specific frame in the video sequence. Or, focusing on a group of frames, the constraint can be expressed as the reordering latency associated with the group of frames in the video sequence. Or, the constraint can be expressed in some other way.

Next, the tool outputs (620) the syntax element(s). This facilitates determination of when reconstructed frames are ready for output in terms of output order of the multiple frames. The syntax element(s) can be output as part of a sequence parameter set or picture parameter set in an elementary coded video bitstream, as part of syntax for a media storage file or media transmission stream that also includes encoded data for the frames, as part of a media properties negotiation protocol (e.g., during exchange of stream or session parameter values in system-level negotiation), as part of media system information multiplexed with encoded data for the frames, or as part of media metadata relating to encoded data for the frames (e.g., in SEI messages or VUI messages). Different syntax elements can be output to indicate memory capacity requirements. For example, a buffer size syntax element (such as max_dec_frame_buffering) can indicate maximum size of a DPB, and a frame memory syntax element (such as num_reorder_frames) can indicate maximum size of frame memory for reordering.

The value of the constraint on latency can be represented in various ways, as described in section V.C. For example, the tool outputs a flag that indicates presence or absence of the syntax element(s). If the flag indicates the syntax element(s) are absent, then the constraint on latency is undefined or has a default value. Otherwise, the syntax element(s) follow and indicate the constraint on latency. Or, one value of the syntax element(s) indicates the constraint on latency is undefined or has a default value, and other possible values of the syntax element(s) indicate an integer count for the constraint on latency. Or, for cases in which the constraint on latency is a constraint on frame reordering latency, a given value of the syntax element(s) indicates an integer count for the constraint on frame reordering latency relative to a maximum size of frame memory for reordering, which is indicated with a different syntax element such as num_reorder_frames. Alternatively, the constraint on latency is represented in some other way.

In some implementations, the frames of the video sequence are organized according to a temporal hierarchy. In this case, different syntax elements can indicate different constraints on frame reordering latencies for different temporal layers of the temporal hierarchy.

F. Generalized Techniques for Receiving and Using Syntax Elements

FIG. 7 shows an example technique (700) for receiving and using syntax elements that facilitate reduced-latency decoding. For example, a real-time communication tool or playback tool described with reference to FIGS. 2a and 2b performs the technique (700). Alternatively, another tool performs the technique (700).

To start, the tool receives and parses (710) one or more syntax elements that indicate a constraint on latency (e.g., frame reordering latency, latency in terms of a time measure). For example, the parsing includes reading the one or more syntax elements that indicate the constraint on latency from the bitstream. The tool also receives (720) encoded data for multiple frames of a video sequence. The tool can parse the syntax element(s) and, based upon syntax element(s), determine the constraint on latency. Typically, a constraint on frame reordering latency is a reordering latency allowed for any frame in the video sequence. The constraint can be expressed in various ways, however, and have various other meanings, as described in the previous section. The syntax element(s) can be signaled as part of a sequence parameter set or picture parameter set in an elementary coded video bitstream, as part of syntax for a media storage file or media transmission stream, as part of a media properties negotiation protocol, as part of media system information multiplexed with the encoded data, or as part of media metadata relating to the encoded data. The tool can receive and parse different syntax elements which indicate memory capacity requirements, for example, a buffer size syntax element such as max_dec_frame_buffering and a frame memory syntax element such as num_reorder_frames.

The value of the constraint on latency can be represented in various ways, as described in section V.C. For example, the tool receives a flag that indicates presence or absence of the syntax element(s). If the flag indicates the syntax element(s) are absent, then the constraint on latency is undefined or has a default value. Otherwise, the syntax element(s) follow and indicate the constraint on latency. Or, one value of the syntax element(s) indicates the constraint on latency is undefined or has a default value, and other possible values of the syntax element(s) indicate an integer count for the constraint on latency. Or, for cases in which the constraint on latency is a constraint on frame reordering latency a given value of the syntax element(s) indicates an integer count for the constraint on frame reordering latency relative to a maximum size of frame memory for reordering, which is indicated with a different syntax element such as num_reorder_frames. Alternatively, the constraint on latency is signaled in some other way.

Returning to FIG. 7, the tool decodes (730) at least some of the encoded data to reconstruct one of the frames. The tool outputs (740) the reconstructed frame. In doing so, the tool can use the constraint on latency to determine when the reconstructed frame is ready for output, e.g., in terms of output order of the frames of the video sequence.

In some implementations, the frames of the video sequence are organized according to a temporal hierarchy. In this case, different syntax elements can indicate different constraints on frame reordering latencies for different temporal layers of the temporal hierarchy. The tool can select one of the different constraints on frame reordering latencies depending on temporal resolution of the output.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. In a computing system that implements a video encoder, a method comprising:
   setting a constraint on delay in terms of a time measure;
   determining a frame rate for encoding;
   based on the constraint on delay and the frame rate, setting a constraint on frame reordering latency consistent with inter-frame dependencies between plural frames of a video sequence;
   setting one or more syntax elements that indicate the constraint on frame reordering latency, wherein the constraint on frame reordering latency is expressed in terms of a maximum count of frames that can precede any frame of the video sequence in output order but follow that frame in coded order;
   with the video encoder, encoding the plural frames to produce encoded data, wherein the encoding uses the inter-frame dependencies that are consistent with the constraint on frame reordering latency; and
   outputting the one or more syntax elements, thereby facilitating determination of when reconstructed frames are ready for output in terms of output order of the plural frames.

2. The method of claim 1, wherein the constraint on delay is set as part of negotiation to trade off responsiveness with ability to smooth out short-term fluctuations in bit rate, encoding complexity, and/or network bandwidth.

3. The method of claim 1, further comprising:
   selecting, from multiple available encoding modes, a low-latency encoding mode for real-time communication, wherein the constraint on delay is set as part of the low-latency encoding mode.

4. The method of claim 1, wherein the time measure is independent of frame rate.

5. The method of claim 1, further comprising:
   before the encoding, receiving the plural frames of the video sequence; and
   after the encoding, outputting the encoded data for storage or transmission.

6. The method of claim 1, wherein a value of the one or more syntax elements indicates an integer count for the constraint on frame reordering latency relative to a maximum size of frame memory for reordering, the maximum size of frame memory for reordering being indicated with a different syntax element.

7. The method of claim 6, wherein the constraint on frame reordering latency can be determined as a maximum count for the maximum size of frame memory for reordering plus the integer count for the constraint on frame reordering latency minus 1.

8. A computing system comprising one or more processing units and memory, wherein the computing system is configured to perform operations comprising:
   as part of negotiation to trade off responsiveness with ability to smooth out short-term fluctuations in bit rate, encoding complexity, and/or network bandwidth, setting a constraint on frame reordering latency consistent with inter-frame dependencies between plural frames of a video sequence;
   setting one or more syntax elements that indicate the constraint on frame reordering latency consistent, wherein the constraint on frame reordering latency is expressed in terms of a maximum count of frames that can precede any frame of the video sequence in output order but follow that frame in coded order;

encoding the plural frames to produce encoded data, wherein the encoding uses the inter-frame dependencies that are consistent with the constraint on frame reordering latency; and outputting the one or more syntax elements, thereby facilitating determination of when reconstructed frames are ready for output in terms of output order of the plural frames.

9. The computing system of claim 8, wherein the operations further comprise, as part of the negotiation:

setting a constraint on delay in terms of a time measure; and determining a frame rate for encoding, wherein the constraint on frame reordering latency is based on the constraint on delay and the frame rate.

10. The computing system of claim 8, wherein the operations further comprise:

selecting, from multiple available encoding modes, a low-latency encoding mode for real-time communication, wherein the constraint on frame reordering latency is set as part of the low-latency encoding mode.

11. The computing system of claim 8, wherein the negotiation is between a transmitter-side tool that includes a video encoder and a receiver-side tool that includes a video decoder.

12. The computing system of claim 8, wherein the operations further comprise:

before the encoding, receiving the plural frames of the video sequence; and after the encoding, outputting the encoded data for storage or transmission.

13. The computing system of claim 8, wherein a value of the one or more syntax elements indicates an integer count for the constraint on frame reordering latency relative to a maximum size of frame memory for reordering, the maximum size of frame memory for reordering being indicated with a different syntax element.

14. The computing system of claim 13, wherein the constraint on frame reordering latency can be determined as a maximum count for the maximum size of frame memory for reordering plus the integer count for the constraint on frame reordering latency minus 1.

15. One or more computer-readable media storing computer-executable instructions for causing a computing system, when programmed thereby, to perform operations, the one or more computer-readable media being selected only from the group consisting of non-volatile memory and storage device, the operations comprising:

selecting, from multiple available encoding modes, a low-latency encoding mode for real-time communication;

as part of the low-latency encoding mode, setting a constraint on frame reordering latency consistent with inter-frame dependencies between plural frames of a video sequence;

setting one or more syntax elements that indicate the constraint on frame reordering latency, wherein the constraint on frame reordering latency is expressed in terms of a maximum count of frames that can precede any frame of the video sequence in output order but follow that frame in coded order;

encoding the plural frames to produce encoded data, wherein the encoding uses the inter-frame dependencies that are consistent with the constraint on frame reordering latency; and outputting the one or more syntax elements, thereby facilitating determination of when reconstructed frames are ready for output in terms of output order of the plural frames.

16. The one or more computer-readable media of claim 15, wherein the multiple available encoding modes further include a regular encoding mode for media playback from a file or stream.

17. The one or more computer-readable media of claim 15, wherein the operations further comprise, as part of the low-latency encoding mode:

setting a constraint on delay in terms of a time measure; and determining a frame rate for encoding, wherein the constraint on frame reordering latency is based on the constraint on delay and the frame rate.

18. The one or more computer-readable media of claim 15, wherein the constraint on frame reordering latency is set as part of negotiation to trade off responsiveness with ability to smooth out short-term fluctuations in bit rate, encoding complexity, and/or network bandwidth.

19. The one or more computer-readable media of claim 15, wherein a value of the one or more syntax elements indicates an integer count for the constraint on frame reordering latency relative to a maximum size of frame memory for reordering, the maximum size of frame memory for reordering being indicated with a different syntax element.

20. The one or more computer-readable media of claim 19, wherein the constraint on frame reordering latency can be determined as a maximum count for the maximum size of frame memory for reordering plus the integer count for the constraint on frame reordering latency minus 1.

* * * * *